Oct. 24, 1967    J. G. SPARKES    3,349,295

ELECTROLYTIC CAPACITOR WITH TUBULAR ANODE AROUND CATHODE
Filed June 16, 1965

INVENTOR.
JULIAN G. SPARKES
BY
Oberlin, Maky & Donnelly
ATTORNEYS

United States Patent Office 3,349,295
Patented Oct. 24, 1967

3,349,295
ELECTROLYTIC CAPACITOR WITH TUBULAR ANODE AROUND CATHODE
Julian G. Sparkes, Chagrin Falls, Ohio, assignor to Industrial Electronic Rubber Co., Twinsburg, Ohio, a corporation of Ohio
Filed June 16, 1965, Ser. No. 464,458
4 Claims. (Cl. 317,230)

ABSTRACT OF THE DISCLOSURE

An electrolytic capacitor having a hollow shell anode and a cathode axially positioned within the shell. The ends of the shell are closed, retaining the electrolyte in a space between anode and cathode.

---

Figure 1:
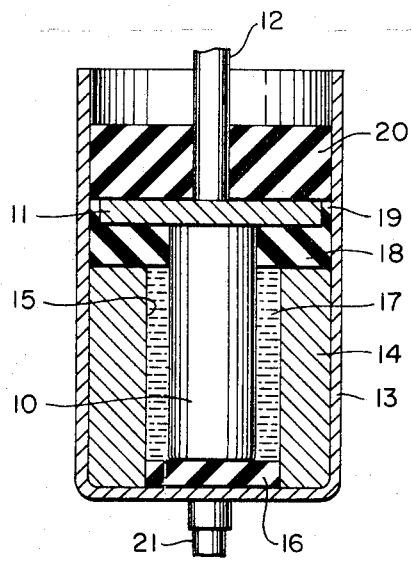

This invention relates to a construction for electrolytic capacitors of the type employing a "valve" or film-forming metal for the anode and has, as a primary object, the provision of such a construction which is especially well suited for utilization in relatively small and miniature sizes of capacitors in this class.

The conventional wet-sintered tantalum capacitor, as a more particular well-known example, comprises a tantalum pellet serving as an anode by placement in spaced relation within a suitable metallic container, with the latter usually being made of silver or copper or an alloy thereof. This container constitutes the cathode of the cell, with electrolyte contained in sealed relation to complete the assembly and suitable connections made respectively to such anode and cathode.

The noted preferred metals for such container are relatively soft, and sealing of the cell is generally accomplished by crimping or spinning this container about an elastomeric plug in such manner as to place the latter under a static load not exceeding the elastic limit of the material, thereby to minimize electrolyte loss. It has also been more recently proposed to incorporate a depolarizer for minimizing or eliminating change in the electrical characteristics of the cell as a result of the application thereto of varying amounts of alternating current voltage, and one method for realizing this feature involves depositing a layer of platinum black on the internal surface of the cathodic container or case which is contacted by the electrolyte.

The foregoing known construction has been found to have certain disadvantages, which are particularly of significance in the smaller sized and miniature cells. The available anode area, for example, is limited to a relatively small value, the preferred metals for the cathode case are subject to softening, even on standing at room temperature, with the result that there is a loss of hardness, and the configuration is such that it is extremely difficult satisfactorily to apply a depolarizer such as the noted platinum black to the case or container. The loss of hardness of the case tends to relieve the static load applied to the elastomeric seal in the spinning or crimping operation, whereby seepage or leakage of the electrolyte can occur, and this softening effect becomes more pronounced at elevated temperatures.

The elimination of the above disadvantageous features of the conventional electrolytic capacitor is a more particular object of the present improvements, realized by providing a new mechanical construction for such a cell.

It is a further object of the invention to provide such a capacitor having a substantially increased available anode area as compared to the conventional assembly set forth, by employing an anode capable of surrounding the cathode in spaced relation.

Another more specific object is to provide such a configuration of anode and cathode in this type of cell without an improved case or container not subject to the softening discussed in the above in the known assembly and also resisting corrosion under normal operating conditions for such a capacitor. The new construction by this improvement eliminates, for practical purposes, the loss of static load on the seal employed and hence the tendency for electrolyte loss on this account.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 2:
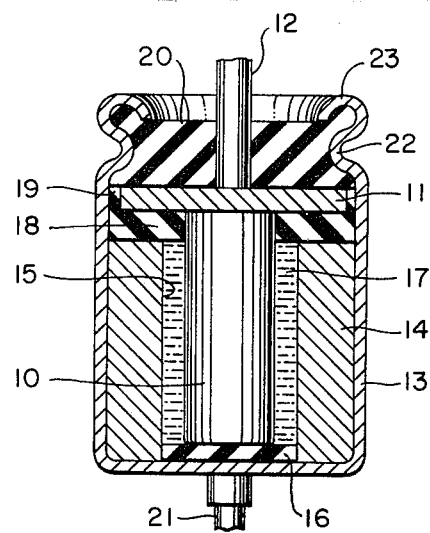

In said annexed drawing:

FIG. 1 is a longitudinal section of an electrolytic capacitor in accordance with the present invention prior to the sealing closure thereof; and FIG. 2 shows the assembly, again in longitudinal section in the completed sealed form ready for use.

With reference now to the drawing in detail, the capacitor is, as indicated above, illustrated in FIG. 1 in assembled form, that is, with all components in proper arrangement, just prior to the operation which closes and seals the cell. In this assembly there is a centrally located cylindrical cathode 10, made of silver, copper, alloys thereof, or other metal available for such component and having attached thereto at its upper end a metallic disk 11, preferably made of silver.

Extending axially upwardly or outwardly from this disk 11 is an attached wire 12, which again will preferably be silver, with these three elements forming the cathode and external connection thereof in the cell.

The thus constituted cathode assembly is located within a case or container 13, in the form of a hollow cylinder open at one end, with this member preferably made of pure tantalum. A powdered and sintered tantalum hollow cylinder or tube 14 is disposed within such tantalum case 13 having its outer wall in contact with and suitably affixed, such as by fusion, to the inner wall of the case over the major length of the letter. As shown, this hollow cylinder 14, which forms the anode of the cell, has an internal diameter in such relative size to the centrally located cathode 10 as to leave an annular space 15 between the two over the major length of the cathode. The latter rests on and is insulated from the case by a circular pad 16 made of a suitable elastomeric material which will not be deleteriously affected by the electrolyte to be used, and the latter is shown at 17 as filling the noted annular space between the center cathode and surrounding anode. The cathode assembly disk member 11 is also supported upon a body 18 of the same elastomeric material, and this body has an upper flange 19 about the periphery of the disk and thereby acting as electrical insulation between the disk and the case 13. The main part of this body 18 is, as shown, under the disk or between the underside thereof and the upper end of the anode cylinder 14. Another cylindrical pad 20 of the elastomeric material is disposed against the outer or uppermost face of the cathode assembly disk 11, with this pad enclosing the cathode connector wire 12 and contacting the wall of the case about its periphery. The assembly is completed by an anode wire 21, which, for example, may be nickel, welded to the outside of the bottom of the case 13. It is preferred that the cathode 10 be porous and treated with platinum black for depolarization.

The case 13 is closed in the manner evident from FIG.

2 by spinning to form an intermediate inwardly projecting bead 22 and crimping the extreme end shown at 23. As will be apparent from comparison of the two drawing illustrations, this spinning and crimping operation causes the elastomeric parts 16, 18, and 20 to be compressed or placed under static load. Since the case in this capacitor is preferably made of pure tantalum, it will not soften over the normal temperature ranges of exposure of the capacitor and will thereby maintain the thus applied static load on the sealing members, and it will, of course, be appreciated that the external case or container is also resistance to corrosion, sulphiding, and generally to damage which would impair a conventional soft metal case.

Other metals within the "valve" classification noted at the outset, in addition to the tantalum discussed, include niobium and aluminum, and the new capacitor configuration of this invention can also be utilized with anodes of these and even further metals of the same type. Such metals, as is known in the art, accept or form in use of the cell, a dielectric film in exposure to the electrolyte. It is preferred that the anode be made of powdered and sintered metal, although in the case of aluminum in particular, the anode body might be solid. All assemblies should employ the same metal for the new tubular anode and the capacitor case, these two components being in conductive contact as disclosed above.

By making the anode in the shape of a hollow cylinder or tube, there is a considerable gain of available anode area as compared to the cylindrical pellet type of anode construction which has been commonly used. A greater volume of the tantalum or other powder can be packed into a given anode of this new configuration at a particular pressed density by utilizing the area around the inside perimeter of the case therefor rather than for clearance or spacing from the cathode. If depolarization of the cathode is not considered necessary or desired, the cathode need not be treated for this purpose, but if this feature should be desired, then it is obvious that the cylindrical cathode form employed can be much more readily treated, such as with the platinum black, than a cathode cup or case in present constructions.

Other modes of applying the principle of the invention may be employed, change being made as regards the details described, provided the features stated in any of the following claims or the equivalent of such be employed.

I, therefore, particularly point out and distinctly claim as my invention:

1. An electrolytic capacitor, comprising a cylindrical film-forming metal case open at one end,
   an anode made of the same metal as said case in the form of a hollow cylinder and comprising a dielectric film thereon, said anode being disposed within said case with the outer surface of the former contacting and affixed to the inner surface of the case,
   a cylindrical metal cathode located in the case with its major extent in uniform spaced relation interiorly of said anode, the anode and cathode spacing defining an annular void therebetween for receiving electrolyte,
   and electrical insulation supporting the cathode in such arrangement and closing the open end of the case.

2. An electrolytic capacitor as set forth in claim 1 wherein said anode and case are made of a metal selected from the group consisting of tantalum, niobium, and aluminum.

3. An electrolytic capacitor as set forth in claim 1 wherein said anode is made of sintered tantalum and said case is made of substantially pure tantalum.

4. An electrolytic capacitor as set forth in claim 3 wherein said tantalum case is closed at its open end by an elastomeric plug, and the case is crimped against the plug to maintain the latter under static load.

References Cited

UNITED STATES PATENTS

| | | | |
|---|---|---|---|
| 2,267,717 | 12/1941 | Brennan | 317—230 |
| 2,743,399 | 4/1956 | Bujan | 317—230 |
| 3,115,596 | 12/1963 | Fritsch | 317—230 |

FOREIGN PATENTS

| | | |
|---|---|---|
| 632,502 | 12/1961 | Canada. |

JAMES D. KALLAM, *Primary Examiner.*